United States Patent
Sugiyama et al.

(10) Patent No.: US 10,073,406 B2
(45) Date of Patent: Sep. 11, 2018

(54) DAMPER DEVICE AND IMAGE FORMING APPARATUS

(71) Applicant: CANON KABUSHIKI KAISHA, Tokyo (JP)

(72) Inventors: Tadahisa Sugiyama, Matsudo (JP); Shigeo Doi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/799,285

(22) Filed: Jul. 14, 2015

(65) Prior Publication Data

US 2016/0018780 A1 Jan. 21, 2016

(30) Foreign Application Priority Data

Jul. 17, 2014 (JP) .................................. 2014-147002
Jun. 18, 2015 (JP) .................................. 2015-123163

(51) Int. Cl.
*G03G 21/16* (2006.01)
*F16F 9/12* (2006.01)

(52) U.S. Cl.
CPC ........... *G03G 21/1633* (2013.01); *F16F 9/12* (2013.01); *G03G 2215/0132* (2013.01)

(58) Field of Classification Search
CPC ............... F16F 15/1206; F16F 15/1207; F16F 15/13157
USPC ........................................................ 399/110
See application file for complete search history.

(56) References Cited

U.S. PATENT DOCUMENTS

| 4,542,810 | A | * | 9/1985 | Shimbara | G11B 15/67542 188/290 |
| 4,576,252 | A | * | 3/1986 | Omata | E05F 3/14 16/82 |
| 5,522,485 | A | * | 6/1996 | Takahashi | F16F 9/12 188/290 |
| 5,718,309 | A | * | 2/1998 | Kariya | F16F 9/12 188/290 |
| 7,246,963 | B2 | * | 7/2007 | Nishimura | B41J 13/106 347/108 |

(Continued)

FOREIGN PATENT DOCUMENTS

JP 2011-20516 A 2/2011

OTHER PUBLICATIONS

Machine translation Jp2012-078713, Nakamura, "Cover opening/closing device", Apr. 19, 2012.*

*Primary Examiner* — Clayton E LaBalle
*Assistant Examiner* — Linda B Smith
(74) *Attorney, Agent, or Firm* — Canon U.S.A., Inc. IP Division (57) ABSTRACT

An image forming apparatus includes a main body, a moving part supported movably relative to the main body, a support portion provided in the main body to support the moving part movably, a rack provided in one of the main body and the moving part and having a rack gear, a damper gear provided in the other of the main body and the moving part to be meshed with the rack gear, a damper configured to apply resistance force to rotation of the damper gear, and a restricting portion provided in the other of the main body and the moving part to be in contact with an abutting portion extending along the rack gear in the rack, the restricting portion restricting a position of the rack to prevent the rack gear from separating from the damper gear.

24 Claims, 6 Drawing Sheets

(56) References Cited

U.S. PATENT DOCUMENTS

| | | | | |
|---|---|---|---|---|
| 7,542,699 B2* | 6/2009 | Kawasaki | | B41J 29/13 399/110 |
| 8,079,450 B2* | 12/2011 | Zeilenga | | E05F 5/00 188/290 |
| 8,934,802 B2* | 1/2015 | Koyanagi | | B41J 13/14 399/81 |
| 9,261,158 B2* | 2/2016 | Doornbos | | F16F 9/12 |
| 9,382,965 B2* | 7/2016 | Zhang | | E05F 3/14 |
| 2002/0034404 A1* | 3/2002 | Kojima | | G03G 21/1814 399/258 |
| 2004/0144604 A1* | 7/2004 | Doornbos | | E05F 3/14 188/290 |
| 2004/0179859 A1* | 9/2004 | Ishii | | G03G 21/1821 399/119 |
| 2005/0023089 A1* | 2/2005 | Okabayashi | | B60R 7/06 188/82.2 |
| 2005/0133507 A1* | 6/2005 | Tanaka | | B65D 43/26 220/263 |
| 2009/0175648 A1* | 7/2009 | Tsuchiya | | G03G 21/1633 399/107 |
| 2010/0326253 A1* | 12/2010 | Nakamura | | G10D 3/02 84/179 |
| 2011/0097106 A1* | 4/2011 | Hosohara | | G03G 15/161 399/101 |
| 2011/0217101 A1* | 9/2011 | Okamoto | | G03G 21/00 399/346 |
| 2014/0083809 A1* | 3/2014 | Shimozaki | | F16F 9/12 192/46 |
| 2014/0294445 A1* | 10/2014 | Ueno | | F16H 21/40 399/167 |
| 2015/0160601 A1* | 6/2015 | Namba | | H04N 1/00 312/326 |
| 2016/0058188 A1* | 3/2016 | Charest | | A47B 88/12 248/636 |

\* cited by examiner

FIG. 5

DAMPER DEVICE AND IMAGE FORMING APPARATUS

BACKGROUND OF THE INVENTION

Field of the Invention

The present invention relates to a damper device and an image forming apparatus including the damper device.

Description of the Related Art

In image forming apparatuses of the related art such as a copying machine, a printer, and a facsimile, an exterior cover serving as a moving part can be moved for the purposes of maintenance and replacement of inner mechanisms and a sheet jam clearing operation.

In recent image forming apparatuses, a damper device is installed for an exterior cover in order to improve operability of users and servicemen. Even when the user releases the user's hand from the exterior cover during an operation of opening or closing the exterior cover, the damper device prevents the exterior cover from opening under its own weight and making impact. Therefore, breakage of the exterior cover and components of the image forming apparatus and displacement of the positions of the components can be prevented from being caused by the impact.

As the damper device, a rack gear is meshed with a pinion gear that is engaged with a shaft protruding from a damper, and a damper function is exerted by applying load to the movement of the rack gear.

To properly exert the damper function, there is a need to prevent the gears from coming out of mesh (tooth skipping). Japanese Patent Laid-Open No. 2011-20516 discloses that a rack gear has flexibility and a contact area between the rack gear and that a pinion gear is bent in the radial direction of the pinion gear to prevent the gears from coming out of mesh.

In the structure described in Japanese Patent Laid-Open No. 2011-20516, the rack gear and the pinion gear are less likely to come out of mesh than when the rack gear does not have flexibility. However, even in this structure, the rack gear and the pinion gear sometimes come out of mesh. For example, great force is sometimes applied to the rack gear in a direction to separate the rack gear from the pinion gear. In such a case, there is a possibility that the gears come out of mesh and a proper damper function is not exerted.

SUMMARY OF THE INVENTION

The present invention prevents a gear and a rack gear from coming out of mesh.

An image forming apparatus according to an aspect of the present invention includes a main body, a moving part supported movably relative to the main body, a support portion configured to support the moving part movably, a rack provided in one of the main body and the moving part and having a rack gear, a damper gear provided in the other of the main body and the moving part to be meshed with the rack gear, a damper configured to apply resistance force to rotation of the damper gear, and a restricting portion provided in the other of the main body and the moving part to be in contact with an abutting portion extending along the rack gear in the rack, the restricting portion restricting a position of the rack to prevent the rack gear from separating from the damper gear.

Further features of the present invention will become apparent from the following description of exemplary embodiments with reference to the attached drawings.

DESCRIPTION OF THE EMBODIMENTS

Figure 1:
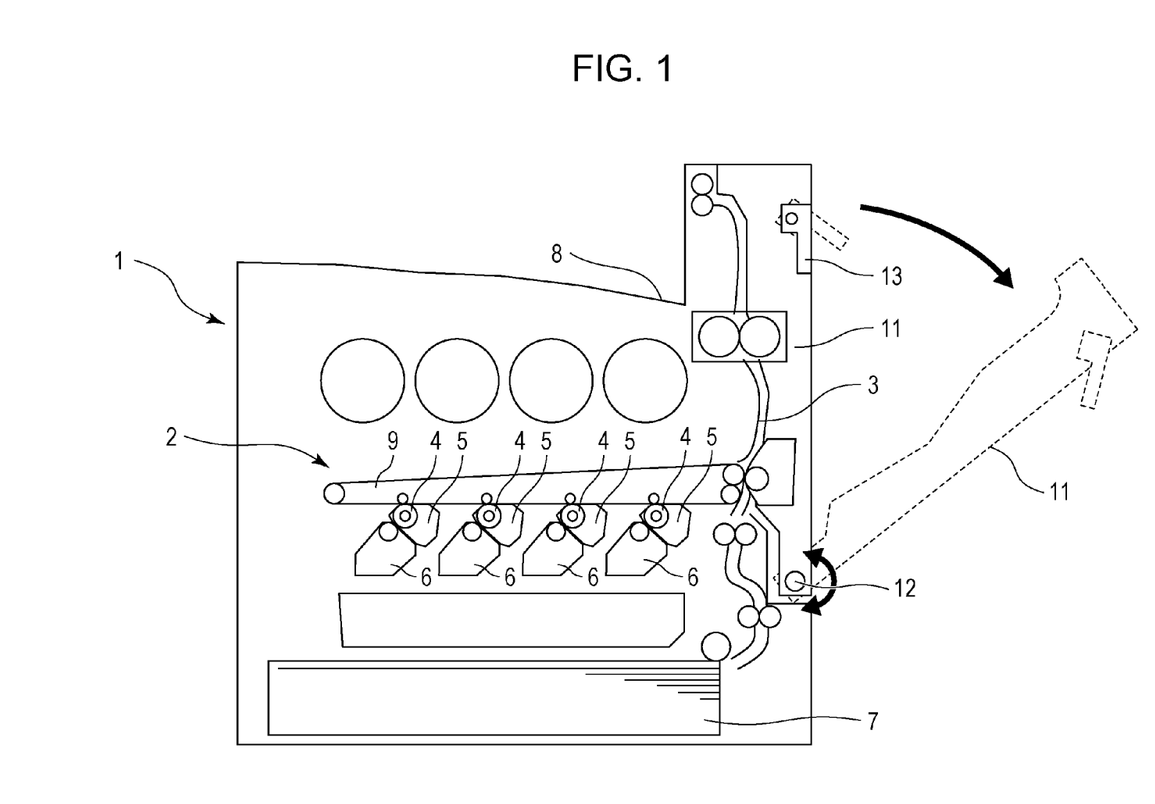
FIG. 1 is an overall view of an image forming apparatus including a damper device according to an embodiment of the present invention.

FIG. 1 is a schematic view of an image forming apparatus including a damper device according to an embodiment of the present invention.

In the image forming apparatus, images are formed on sheets by an image forming unit 2 disposed inside an image forming apparatus main body 1 (hereinafter referred to as a main body 1). The image forming apparatus includes the main body 1, the image forming unit 2, and a sheet conveying path 3.

The image forming unit 2 includes drum units 5 having photosensitive drums 4 on which electrostatic latent images based on image data are to be formed, and developing units 6 that develop the electrostatic latent images by supplying toner to the photosensitive drums 4. The image forming unit 2 further includes an intermediate transfer belt 9 on which toner images formed on the photosensitive drums 4 are to be transferred. The image forming unit 2 is detachably mounted in the main body 1 for the purposes of maintenance and replacement of internal mechanisms.

The sheet conveying path 3 guides sheets fed out from a sheet feeding cassette 7 for feeding the sheets to a discharge part 8 in which the sheets are to be discharged. When the sheet conveying path 3 conveys a sheet, toner images on the intermediate transfer belt 9 are transferred on the sheet.

The image forming apparatus includes a cover part 11 serving as an opening and closing section that can open and close relative to the main body 1 so that maintenance of the image forming unit 2 is performed and replacement parts are taken outside.

The cover part 11 is supported by a shaft 12 (support portion) disposed in a lower part of the main body 1, and is disposed on a right side surface of the main body 1 to turn on the shaft 12. The cover part 11 serving as a moving part movable relative to the main body 1 is provided with a grip portion 13 that allows the user to move the cover part 11. For example, at the time of a jam clearing operation and maintenance of the internal mechanisms, the user turns the cover part 11 on the shaft 12 by moving the cover part 11 from the main body 1 to the right while handling the grip portion 13. When the cover part 11 turns, the interior of the main body 1 is exposed so that the user can access the interior of the main body 1. In the embodiment, the shaft 12 is disposed as the support portion in the main body 1, and supports the cover part 11 turnably. However, the cover part 11 may have a shaft, and a bearing for rotatably supporting the shaft of the cover part 11 may be provided as a support portion in the main body 1.

Figure 2:
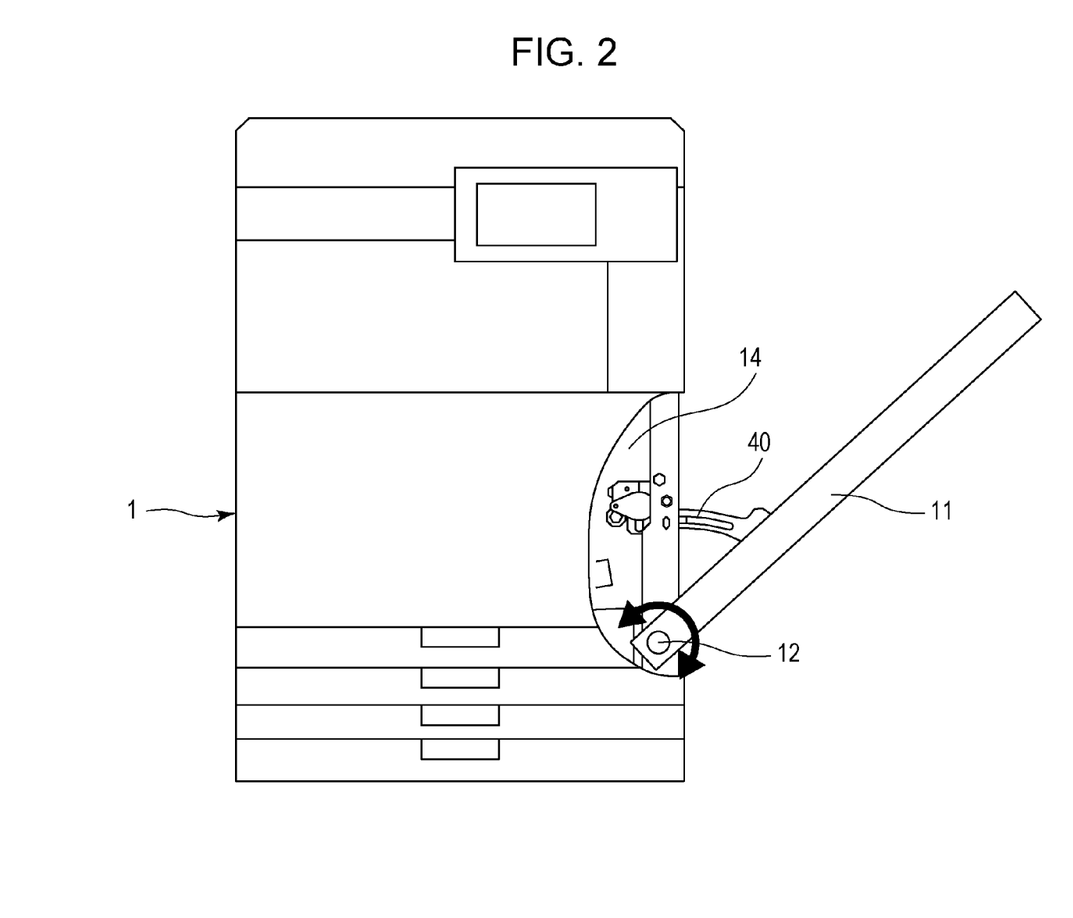
FIG. 2 is an overall view of the image forming apparatus including a cross section of a portion near the damper device according to the embodiment.

FIG. 2 is an overall view of the image forming apparatus in which the cover part 11 is open.

A curved rack 40 provided in the cover part 11 is supported by the cover part 11 in a cantilevered manner, and extends toward the main body 1. The rack 40 moves along with turning of the cover part 11.

Figure 3A:
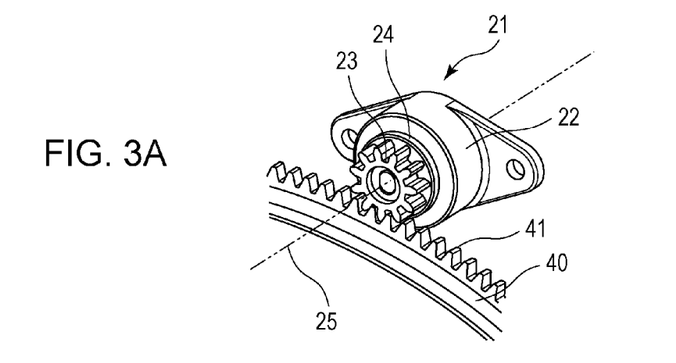
FIG. 3A illustrates the damper device of the embodiment.

A main body frame 14 of the main body 1 is provided with a damper unit 21 that engages with the rack 40, as illustrated in FIG. 3A. When the rack 40 moves along with turning of the cover part 11 and engages with the damper unit 21, the damper unit 21 exerts a damper function. That is, the damper unit 21 applies load to the movement of the cover part 11 (rack 40). The damper unit 21 is attached to the main body frame 14 with a holding member 30 illustrated in FIG. 3B being disposed therebetween. A damper device constituted by the rack 40, the damper unit 21, and the holding member 30 will be described below with reference to FIGS. 3A, 3B, 3C, and 4.

Figure 3B:
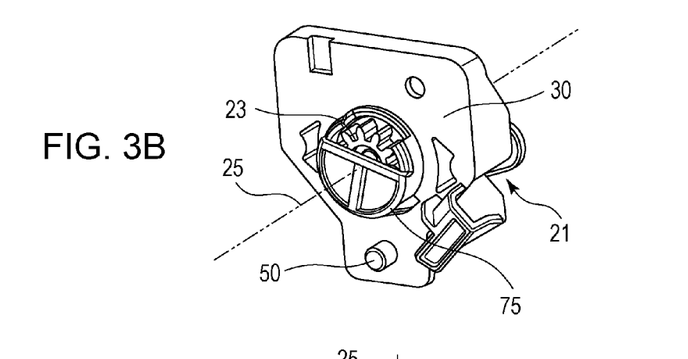
FIG. 3B illustrates the damper device of the embodiment.
Figure 3C:
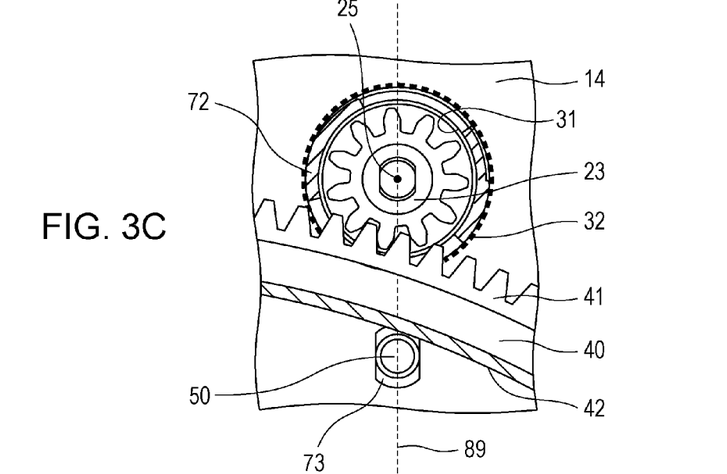
FIG. 3C illustrates the damper device of the embodiment.
Figure 4:
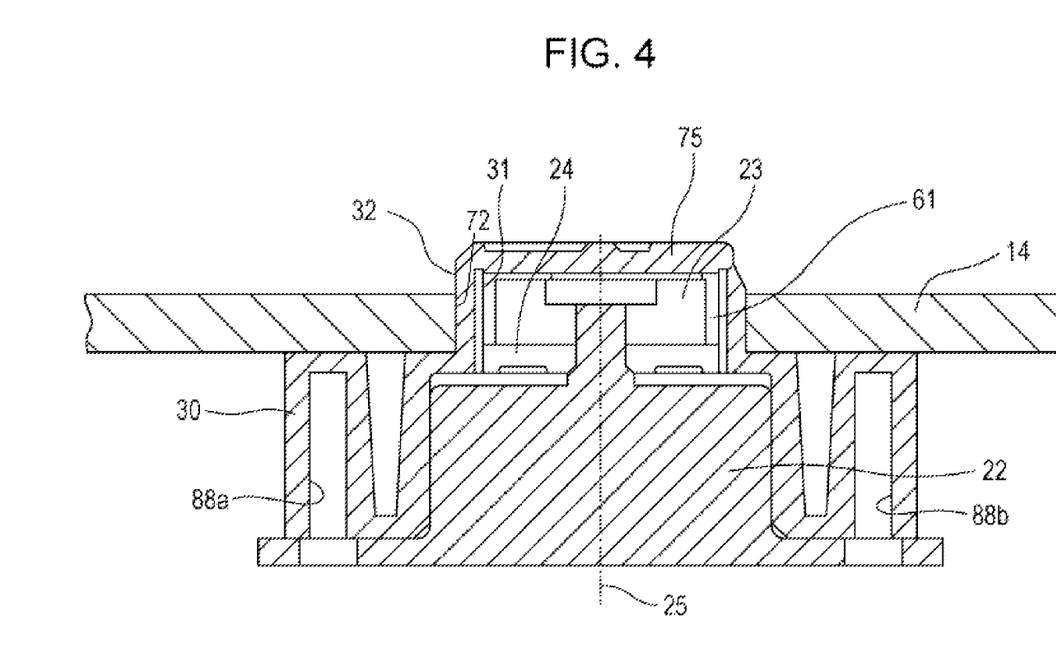
FIG. 4 is a cross-sectional view illustrating a state in which a holding member that holds a damper unit is disposed in a main body frame.

FIG. 3A is a perspective view of the damper device in which the damper unit 21 and the rack 40 are engaged with each other. FIG. 3B is a perspective view of the damper unit 21 of FIG. 3A and the holding member 30. FIG. 3C is an explanatory view illustrating a state in which the damper unit 21 and the rack 40 are engaged with each other. FIG. 4 is a cross-sectional view of the damper device in a state in which the holding member 30 holding the damper unit 21 is disposed in the main body frame 14.

As illustrated in FIG. 3A, the damper unit 21 that applies load to the rack 40 during movement of the rack 40 includes a damper 22 and a pinion gear 23 serving as a damper gear engaged with the damper 22. The inside of a casing of the damper 22 is filled with oil. The pinion gear 23 having a flange portion 24 is provided on a shaft protruding from the casing. That is, the damper 22 applies load to rotation of the pinion gear 23.

The rack 40 provided in the cover part 11 has a rack gear 41 meshed with the pinion gear 23. When the cover part 11 turns, the damper unit 21 applies load to the rack 40. Thus, even when the user releases the user's hand while opening the cover part 11, the cover part 11 is prevented from opening under its own weight and causing loud noise or great impact. Hence, breakage of the cover part 11, breakage of the components of the image forming apparatus, and displacement of the positions of the components can be prevented from being caused by the impact when the cover part 11 is opened.

FIG. 3B is a perspective view of the holding member 30, which is not illustrated in FIG. 3A, for holding the damper unit 21. The holding member 30 has a positioning pin 50 serving as a restricting portion that restricts the position of the rack 40.

As illustrated in FIG. 3C, the rack 40 has a rear face 42 on a side opposite from the rack gear 41. The rear face 42 extends in the extending direction in which teeth of the rack gear 41 are aligning. The positioning pin 50 is in slidable contact with the rear face 42 serving as an abutting portion. The positioning pin 50 in slidable contact with the rear face 42 of the rack 40 is disposed on a straight line 89 that connects the rotation center of the pinion gear 23 and a portion where the pinion gear 23 and the rack gear 41 are meshed with each other. The positioning pin 50 restricts the position of the rack 40 so that the pinion gear 23 and the rack gear 41 are prevented from coming out of mesh. For this reason, when the cover part 11 is turned, the rack 40 moves along with the turn of the cover part 11 while the pinion gear 23 and the rack gear 41 are reliably kept in mesh. Since the pinion gear 23 and the rack gear 41 are reliably kept in mesh, the damper function of the damper unit 21 is exerted properly.

[Regarding Positioning of Damper Unit 21 in Holding Member 30]

As illustrated in FIG. 4, the holding member 30 includes a projecting portion 75 having a recessed portion 61 therein. The pinion gear 23 engaged with the damper 22, as illustrated in FIG. 3A, has a flange portion 24.

As illustrated in FIG. 4, the damper unit 21 is positioned in the holding member 30 in a state in which the pinion gear 23 is fitted in the recessed portion 61 so that an outer peripheral surface of the flange portion 24 is in contact with an inner peripheral surface (contact portion) 31 of the recessed portion 61 in the holding member 30. The damper unit 21 is fixed to the holding member 30 by two screws inserted in two screw holes 88a and 88b. In the embodiment, the inner peripheral surface 31 of the holding member 30 in contact with the outer peripheral surface of the flange portion 24 (a part of the shaft of the pinion gear 23) serves as the contact portion in contact with the flange portion 24. However, the contact portion in contact with the flange portion 24 does not always need to be the arc-shaped portion, and may be, for example, a flat portion disposed on a side opposite from the portion where the pinion gear 23 and the rack gear 41 are meshed, when viewed from the rotation center of the pinion gear 23.

Figure 5:
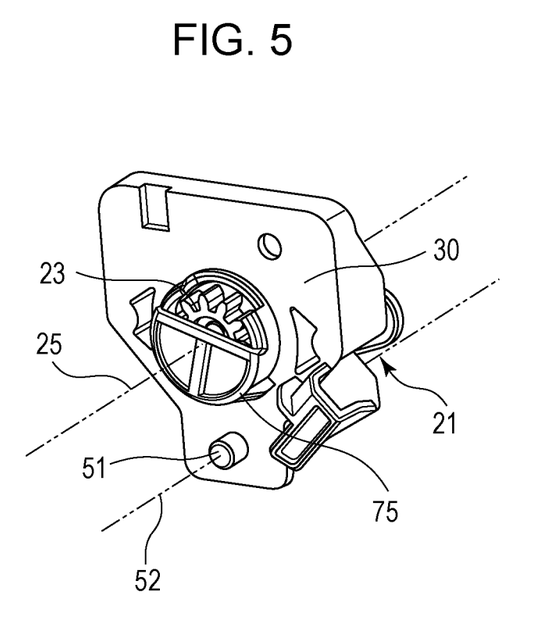
FIG. 5 illustrates a modification of the damper unit.

As described with reference to FIG. 3C, since the rack 40 moves with the rear face 42 being in contact with the positioning pin 50 serving as the restricting portion, the position of the rack gear 41 is determined by the positioning pin 50. That is, the position of the rack 40 is restricted by the positioning pin 50 so that the rack gear 41 does not separate from the pinion gear 23. In the embodiment, the positioning pin 50 serving as the restricting portion is fixed to the holding member 30. However, as illustrated in FIG. 5, a positioning pin 51 that is rotatable on a rotation center 52 may be provided as a restricting portion in the holding member 30. In this example illustrated in FIG. 5, when the rack 40 moves, the positioning pin 51 is rotated on the rotation center 52 by friction with the rear face 42 of the rack gear 41.

As described above, the positioning pin 50 for positioning the rack 40 is disposed on the holding member 30 in which the pinion gear 23 is positioned. Therefore, the positional relationship (positioning accuracy) between the pinion gear 23 and the positioning pin 50 is determined by the component accuracy of the holding member 30. According to the above, in this embodiment in which the holding member 30 includes the positioning pin 50 that positions the pinion gear 23 and is in contact with the rack 40, the positioning accuracy between the pinion gear 23 and the rack gear 41 is high. Since the positioning accuracy between the pinion gear 23 and the rack gear 41 is high, the pinion gear 23 and the rack gear 41 are unlikely to come out of mesh. In this way, the holding member 30 functions as a restricting member that restricts the position of the rack 40 relative to the pinion gear 23.

The pinion gear 23 is positioned by the contact of the outer peripheral surface of the flange portion 24 of the pinion gear 23 with the inner peripheral surface 31 of the holding member 30. Therefore, not only the position of a center shaft 25 (see FIG. 4) of the pinion gear 23 is accurately determined relative to the holding member 30, but also the following advantage is obtained. That is, since the holding member 30 is in contact (at inner peripheral surface 31) with the outer peripheral surface of the flange portion 24, even if the pinion gear 23 receives force in a direction to tilt, the holding member 30 can prevent the pinion gear 23 from tilting. Therefore, even when a great force is applied to the pinion gear 23 via the rack 40 in the direction to tilt the pinion gear 23, the pinion gear 23 rarely tilts owing to the holding member 30. This suppresses trouble such that the rack gear 41 and the pinion gear 23 separate and the pinion gear 23 and the rack gear 41 are prevented from coming out of mesh.

In this way, in the embodiment, it is possible to prevent the rack gear 41 and the pinion gear 23 from coming out of mesh by a simple structure.

[Regarding Engaging Relationship Between Holding Member and Main Body Frame]

As illustrated in FIGS. 3C and 4, the main body frame 14 has an attachment hole 72 serving as an attachment portion in which the projecting portion 75 of the holding member 30 is fitted. Further, as illustrated in FIG. 3C, the main body frame 14 has a slot 73 serving as an opening in which the positioning pin 50 is fitted.

The holding member 30 that holds the pinion gear 23 is attached to the main body frame 14 by unillustrated screws. At this time, a peripheral surface 32 serving as a circular arc surface, which is concentric with the inner peripheral surface 31 of the holding member 30 that positions the pinion gear 23, comes into contact with a rim of the attachment hole 72 of the main body frame 14, and the holding member 30 is positioned relative to the main body frame 14. Thus, the pinion gear 23 is accurately positioned in the main body 1.

The holding member 30 is attached to the main body frame 14 with the positioning pin 50 being fitted in the slot 73 of the main body frame 14. In this way, the positioning pin 50 is also used as a positioning member that prevents the damper unit 21 and the holding member 30 from turning relative to the main body frame 14. Therefore, the position of the positioning pin 50 relative to the main body 1 does not vary owing to variations in the positions where the damper unit 21 and the holding member 30 are fixed to the main body 1. Hence, a moving path, which is defined by the positioning pin 50, of the rack 40 along with the operation of opening or closing the cover part 11 can be accurately set relative to the main body 1. According to the above, the positional relationship between the rack 40 attached to the cover part 11 turnably supported by the main body 1 and the pinion gear 23 can also be determined accurately. As a result, trouble such that the rack gear 41 and the pinion gear 23 come out of mesh can be suppressed.

If tooth skipping occurs between the pinion gear 23 and the rack gear 41, the damper function is not exerted on the cover part 11 and the cover part 11 opens. This may generate vibration in the main body of the image forming apparatus. The generated vibration may displace the attachment positions of the components or displace the positions of devices adjusted by using a jig during assembly. Displacement of the positions of the components or the devices may cause an image defect.

Figure 6:
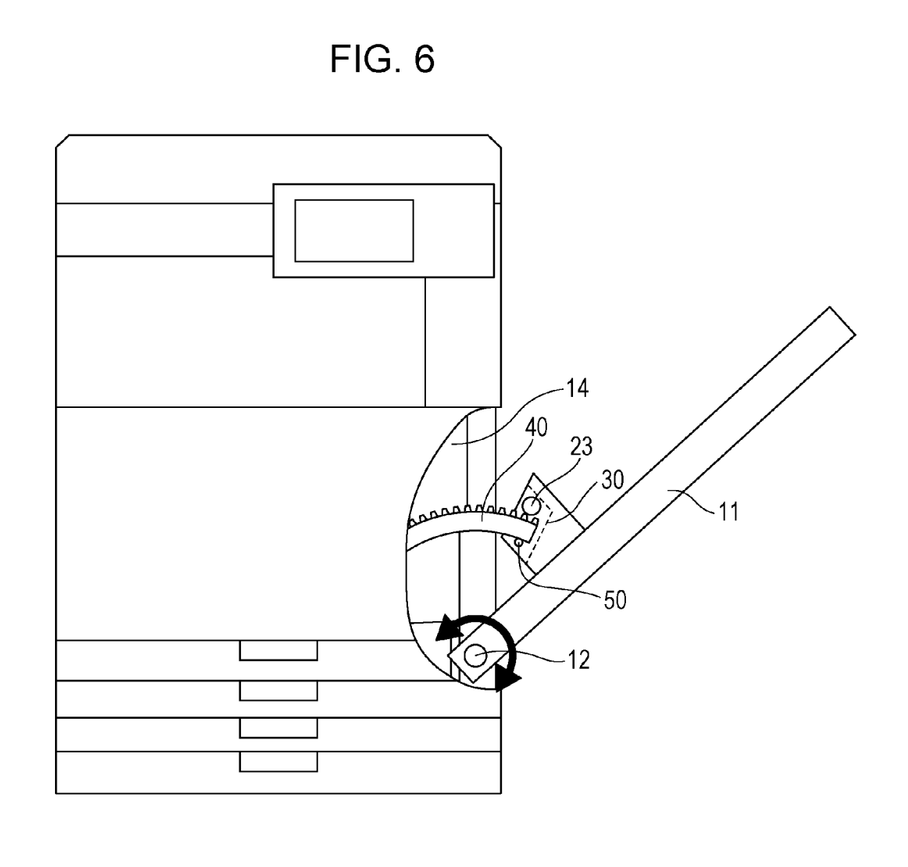
FIG. 6 illustrates a modification of the damper device.

In the above-described embodiment, the rack 40 is provided in the cover part 11, and the pinion gear 23 is provided in the main body of the apparatus. However, as illustrated in FIG. 6, the rack 40 may be provided in the main body frame 14 of the main body of the apparatus. The holding member 30 that holds the pinion gear 23 (damper unit) and has the positioning pin 50 may be provided in the cover part 11.

In the embodiment, the inside of the casing of the damper 22 is filled with oil, and the viscosity of the oil applies load to the rotation of the pinion gear 23. However, load may be applied to the rotation of the pinion gear 23 by elastic force of a spring instead of the oil.

In the embodiment, since the positional relationship between the pinion gear 23 and the rack gear 41 can be accurately ensured according to the above-described structure, the pinion gear 23 and the rack gear 41 are prevented from coming out of mesh. That is, in the embodiment, even if great force is applied in a direction to separate the pinion gear 23 and the rack gear 41, the damper function can be reliably exerted. Since the damper function can be reliably exerted, the occurrence of vibration that displaces the attachment positions of the components can be prevented. Hence, an image defect resulting from the displacement of the attachment positions of the components can be avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-147002 filed Jul. 17, 2014 and No. 2015-123163 filed Jun. 18, 2015, which are hereby incorporated by reference herein in their entirety.

What is claimed is:

1. An image forming apparatus comprising:
    an apparatus main body including an image forming unit to form an image on a sheet on a sheet conveying path;
    a moving part supported by the apparatus main body and configured to be rotated to take an opened position and a closed position with respect to the apparatus main body;
    a rack provided in one of the apparatus main body and the moving part, wherein the rack includes a rack gear and an abutting portion extending along the rack gear;
    a damper unit provided in the other of the apparatus main body and the moving part, wherein the damper unit includes a damper main body and a damper gear unit,
    wherein the damper gear unit includes a gear portion, meshed with the rack gear, and a flange portion provided along a rotation shaft of the gear portion, wherein the gear portion and the flange portion integrally rotate, and
    wherein the damper gear unit is rotatably supported by the damper main body such that a resistance force is applied from the damper main body through the gear portion to the rack gear during rotation of the moving part towards the opened position;
    a holding member configured to hold the damper main body;
    a first restricting portion provided on the holding member and configured to restrict a position of the rack by abutting to the abutting portion of the rack so that the rack gear is secured between the first restricting portion and the gear portion meshed with the rack gear; and
    a second restricting portion provided on the holding member and configured to restrict a position of damper gear unit by contacting an outer peripheral surface of the flange portion of the damper gear unit,
    wherein, during rotation of the moving part towards the opened position and towards the closed position, the outer peripheral surface of the flange portion can contact the second restricting portion of the holding member while rotating relative to the second restricting portion of the holding member.

2. The image forming apparatus according to claim 1, wherein the abutting portion is provided in an end portion of the rack opposite from the rack gear.

3. The image forming apparatus according to claim 1, wherein the holding member attaches the damper main body to the other of the apparatus main body and the moving part.

4. The image forming apparatus according to claim 1, wherein the first restricting portion is disposed on a straight line that connects a rotation center of the damper gear unit and a portion where the damper gear unit and the rack gear are meshed with each other.

5. The image forming apparatus according to claim 1, wherein the rack is provided in the moving part.

6. The image forming apparatus according to claim 1, wherein the rack is provided in the apparatus main body.

7. The image forming apparatus according to claim 1, wherein the holding member holds the damper main body to fix the position of the damper main body with respect to the apparatus main body.

8. The image forming apparatus according to claim 1, wherein, in a case a force in a direction to tilt between the rack gear and the gear portion is applied to the gear portion, the contact between the second restricting portion and the rotating outer peripheral surface of the flange portion keeps the rack gear and the gear portion from coming out of mesh due to the force applied to the gear portion in the direction to tilt.

9. The image forming apparatus according to claim 1, wherein the first restricting portion is rotatable on a rotation center.

10. The image forming apparatus according to claim 1, wherein the moving part is supported movably relative to the apparatus main body to allow paper jam clearing operation and maintenance of mechanisms internal to the apparatus main body.

11. The image forming apparatus according to claim 1, wherein the first restricting portion and the second restricting portion are arranged to prevent the moving part from moving on its own and causing vibration resulting in image defect of the image formed on the sheet due to the rack gear separating from the gear portion.

12. The image forming apparatus according to claim 1, wherein the damper unit includes, as one member, the damper main body and the damper gear unit.

13. The image forming apparatus according to claim 1, wherein the second restricting portion is provided as an inner peripheral surface of the holding member.

14. The image forming apparatus according to claim 3, wherein the holding member has a holding member outer peripheral surface concentric with the second restricting portion, and
wherein the holding member is positioned relative to the other of the apparatus main body and the moving part with the holding member outer peripheral surface being in contact with the other of the apparatus main body and the moving part.

15. The image forming apparatus according to claim 3, wherein the first restricting portion is a pin provided on the holding member, and
wherein the holding member is positioned relative to the other of the apparatus main body and the moving part with the pin being fitted in an opening provided in the other of the apparatus main body and the moving part to extend through the opening and abut the abutting portion of the rack.

16. A damper device for an image forming apparatus having an apparatus main body including an image forming unit to form an image on a sheet on a sheet conveying path, and having a moving part supported by the apparatus main body and configured to be rotated to take an opened position and a closed position with respect to the apparatus main body, the damper device comprising:
a rack provided in one of the apparatus main body and the moving part, wherein the rack includes a rack gear and an abutting portion extending along the rack gear;
a damper unit provided in the other of the apparatus main body and the moving part,
wherein the damper unit includes a damper main body and a damper gear unit, wherein the damper gear unit includes a gear portion, meshed with the rack gear, and a flange portion provided along a rotation shaft of the gear portion, wherein the gear portion and the flange portion integrally rotate, and
wherein the damper gear unit is rotatably supported by the damper main body such that a resistance force is applied from the damper main body through the gear portion to the rack gear during rotation of the moving part towards the opened position;
a holding member configured to hold the damper main body;
a first restricting portion provided on the holding member and configured to restrict a position of the rack by abutting to the abutting portion of the rack so that the rack gear is secured between the first restricting portion and the gear portion meshed with the rack gear; and
a second restricting portion provided on the holding member and configured to restrict a position of damper gear unit by contacting an outer peripheral surface of the flange portion of the damper gear unit,
wherein, during rotation of the moving part towards the opened position and towards the closed position, the outer peripheral surface of the flange portion can contact the second restricting portion of the holding member while rotating relative to the second restricting portion of the holding member.

17. The damper device according to claim 16, wherein the abutting portion is provided in an end portion of the rack opposite from the rack gear.

18. The damper device according to claim 16, wherein the holding member attaches the damper main body to the other of the apparatus main body and the moving part.

19. The damper device according to claim 16, wherein the first restricting portion is disposed on a straight line that connects a rotation center of the damper gear unit and a portion where the damper gear unit and the rack gear are meshed with each other.

20. The damper device according to claim 16, wherein the rack is provided in the moving part.

21. The damper device according to claim 16, wherein the rack is provided in the apparatus main body.

22. The image forming apparatus according to claim 16, wherein the second restricting portion is provided as an inner peripheral surface of the holding member.

23. The damper device according to claim 18,
wherein the holding member has a holding member outer peripheral surface concentric with the second restricting portion, and
wherein the holding member is positioned relative to the other of the apparatus main body and the moving part with the holding member outer peripheral surface being in contact with the other of the apparatus main body and the moving part.

24. The damper device according to claim 18,
wherein the first restricting portion is a pin provided on the holding member, and
wherein the holding member is positioned relative to the other of the apparatus main body and the moving part with the pin being fitted in an opening provided in the other of the apparatus main body and the moving part to extend through the opening and abut the abutting portion of the rack.

* * * * *